United States Patent
Vijayvargiya et al.

(10) Patent No.: US 12,197,418 B1
(45) Date of Patent: Jan. 14, 2025

(54) ACCURACY REGRESSION DETECTION FOR TIME SERIES ANOMALY DETECTION COMPUTE SERVICES

(71) Applicant: Amazon Technologies, Inc., Seattle, WA (US)

(72) Inventors: Ketan Vijayvargiya, Redmond, WA (US); Aditya Bahuguna, Seattle, WA (US); Laurent Callot, Seattle, WA (US); Mohammed Talal Yassar Azam, Snoqualmie, WA (US)

(73) Assignee: Amazon Technologies, Inc., Seattle, WA (US)

( * ) Notice: Subject to any disclaimer, the term of this patent is extended or adjusted under 35 U.S.C. 154(b) by 220 days.

(21) Appl. No.: 17/833,042

(22) Filed: Jun. 6, 2022

(51) Int. Cl.
*G06F 11/14* (2006.01)
*G06F 11/32* (2006.01)
*G06F 11/34* (2006.01)
*G06F 16/23* (2019.01)

(52) U.S. Cl.
CPC ...... *G06F 16/2365* (2019.01); *G06F 11/1446* (2013.01); *G06F 11/327* (2013.01); *G06F 11/3419* (2013.01)

(58) Field of Classification Search
CPC .... G06F 11/14; G06F 11/1446; G06F 11/327; G06F 11/3419
See application file for complete search history.

(56) References Cited

U.S. PATENT DOCUMENTS

| | | | |
|---|---|---|---|
| 11,734,116 B1* | 8/2023 | Bunescu | G06F 16/2358 714/38.1 |
| 2008/0221941 A1* | 9/2008 | Cherkasova | G06F 11/3409 718/105 |
| 2016/0062950 A1* | 3/2016 | Brodersen | G06F 17/18 702/181 |
| 2017/0315961 A1* | 11/2017 | Natsumeda | G06N 5/04 |
| 2019/0124045 A1* | 4/2019 | Zong | G06N 7/01 |

(Continued)

OTHER PUBLICATIONS

Amazon Web Services, Inc., "Amazon Lookout for Metrics—API Reference—API Version Jul. 25, 2017", Available Online at <https://aws.amazon.com/lookout-for-metrics/resources/>, retrieved Jun. 6, 2022, 170 pages.

(Continued)

*Primary Examiner* — Kamini B Patel
(74) *Attorney, Agent, or Firm* — Nicholson DeVos Webster & Elliott LLP

(57) ABSTRACT

Techniques for detecting regressions with respect to the accuracy of an anomaly detection compute service in detecting anomalies in users' time series data. The techniques include providing an instrumented time series instrumented with a set of one or more anomalies to the anomaly detection service. The anomaly detection service detects a set of one or more anomalies in the instrumented time series. The precision and recall of the detected anomalies with respect to the instrumented anomalies is computed. From the computed precision and recall, an anomaly detection accuracy is computed as an F-score or F-measure. It is then determined whether a regression in anomaly detection accuracy has occurred by comparing the computed accuracy score to a threshold. If a regression has occurred, an alert can be generated or a recent change to the anomaly detection service can be rolled back.

20 Claims, 7 Drawing Sheets

(56) References Cited

U.S. PATENT DOCUMENTS

| | | | |
|---|---|---|---|
| 2020/0201940 A1* | 6/2020 | Nelson | G06N 20/00 |
| 2020/0267057 A1* | 8/2020 | Garvey | H04L 41/0816 |
| 2020/0296124 A1* | 9/2020 | Pratt | H04L 63/20 |
| 2022/0124110 A1* | 4/2022 | Chhabra | H04L 63/1416 |
| 2023/0088784 A1* | 3/2023 | Negussie | G06F 11/008 |
| | | | 717/102 |
| 2023/0289568 A1* | 9/2023 | Eichler | G06N 3/084 |

OTHER PUBLICATIONS

Amazon Web Services, Inc., "Amazon Lookout for Metrics—Developer Guide", Available Online at <https://aws.amazon.com/lookout-for-metrics/resources/>, retrieved Jun. 6, 2022, 89 pages.

* cited by examiner

ACCURACY REGRESSION DETECTION FOR TIME SERIES ANOMALY DETECTION COMPUTE SERVICES

BACKGROUND

The present disclosure relates generally to anomaly detection compute services for time series data and, more particularly, to systems and methods for detecting regressions in the accuracy of such services in detecting anomalies in time-series data.

Detecting regressions with respect to the accuracy of a compute service in detecting anomalies in time series data can affect how well the compute service is received by users. Consider an example where the compute service provider has updated, changed, or reconfigured software that implements an anomaly detection algorithm. The compute service provider may wish to update the software to improve the recall or precision in detecting anomalies in users' time series data. Detecting regressions in the accuracy of the anomaly detection algorithm implementation can be critically important. For example, if the accuracy on certain users' time series data unexpectedly decreases after the software upgrade, change, or reconfiguration, then the service provider may wish to roll back the update, change, or reconfiguration to a previous version until the cause of the regression can be identified and remedied.

BRIEF DESCRIPTION OF DRAWINGS

Various examples in accordance with the present disclosure will be described with reference to the drawings, in which.

DETAILED DESCRIPTION

Figure 1:
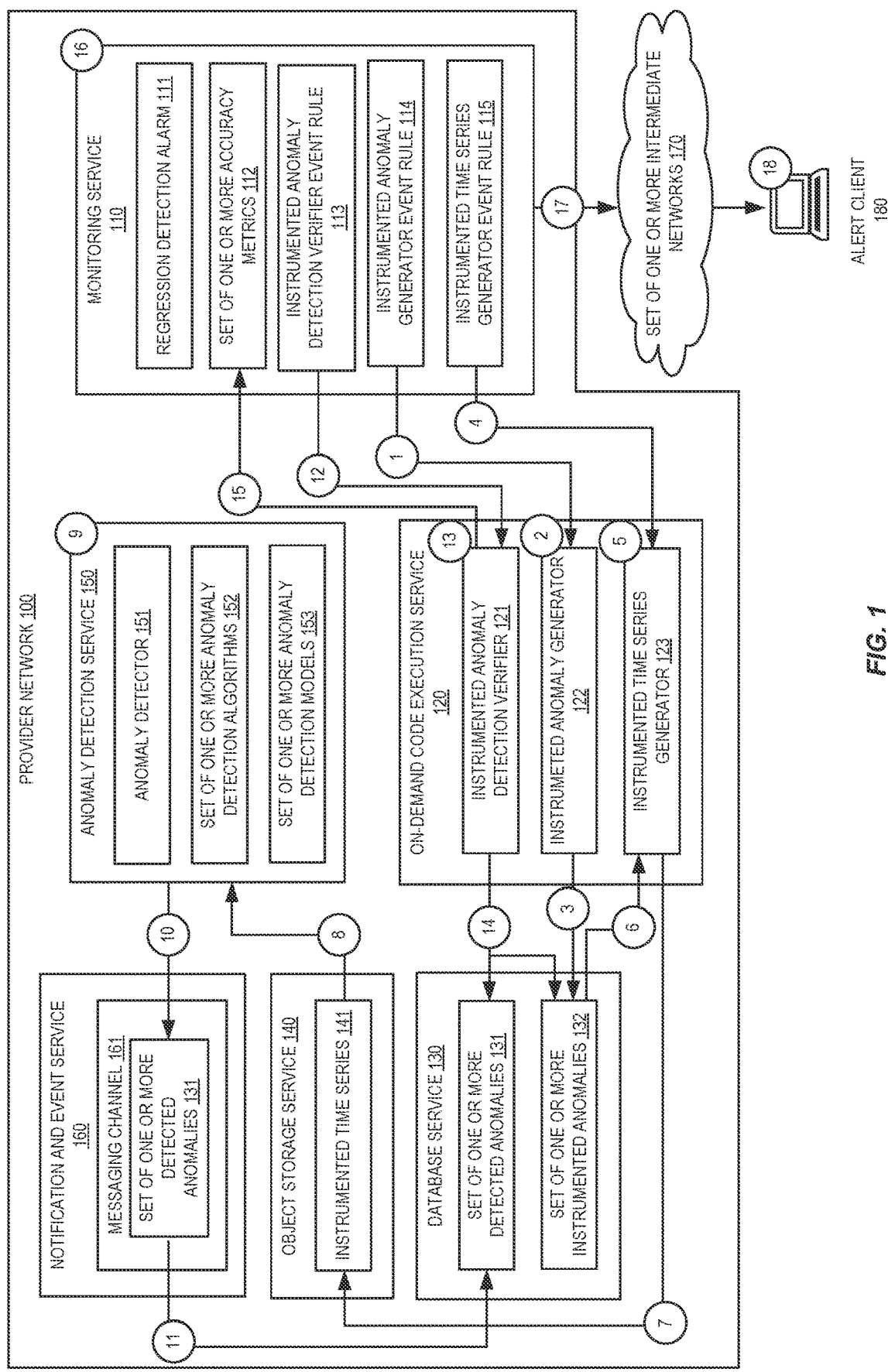
FIG. 1 illustrates an example provider network environment that implements techniques for detecting regressions in the accuracy of an anomaly detection service in detecting anomalies in time-series data, according to some examples.

Techniques are disclosed for detecting regressions with respect to the accuracy of an anomaly detection compute service in detecting anomalies in users' time series data. The techniques can include providing an instrumented time series to the anomaly detection service. The instrumented time series can be instrumented with a set of one or more predetermined anomalies. The anomaly detection service can detect a set of one or more anomalies in the instrumented time series. The precision and recall of the detected anomalies with respect to the predetermined anomalies can be computed. From the computed precision and recall, an anomaly detection accuracy can be computed (e.g., as an F-score or F-measure). Based on the computed accuracy, it can be determined whether a regression in anomaly detection accuracy has occurred (e.g., by comparing the computed accuracy score to a threshold). If a regression has occurred, an alert (notification) can be generated or a recent change to the anomaly detection service can be rolled back (reversed).

The techniques can improve the operation of the anomaly detection compute service. The techniques can improve the operation of the anomaly detection compute service for the service provider by enabling the automatic detection of a purported improvement or upgrade to the compute service that in fact mistakenly or unexpectedly reduces the anomaly detection accuracy of the service for one or more users' time-series data. The techniques can allow the service provider to detect and remedy accuracy regressions potentially before users notice the regressions. The techniques can also improve the operation of the anomaly detection compute service itself. Specifically, the techniques can reduce the amount of computing resources (e.g., processor cycles and memory) consumed by the anomaly detection service executing anomaly detection algorithms and models with undetected accuracy regressions.

The ability to detect regressions in the accuracy of detecting anomalies in time-series data can be vitally important to the success of an anomaly detection compute service. Unfortunately, one cannot always know beforehand which changes, upgrades, or reconfigurations to the anomaly detection algorithms or models used by the compute service to detect anomalies will introduce regressions. So, regression detection is needed. Along with the need for regression detection, there is a need for user customization to accommodate different user-specific use cases, time-series data patterns, and anomaly conditions.

Techniques herein balance the need for automatic regression detection with the need to allow users to configure parameters of the regression detection on their time-series data using interval processing of user-defined instrumented time series data that can be instrumented with one or more user-defined anomalies. At a processing of instrumented time-series data on the interval, a set of one or more anomalies can be detected by the anomaly detection compute service. The number of anomalies detected that are instrumented anomalies (precision) can be determined and the number of the instrumented anomalies that are detected (recall) can be determined. From the precision and recall, the accuracy of anomaly detection on the instrumented time series data can be determined (e.g., as a F-score or F-measure). If the accuracy is outside a threshold accuracy (e.g., an $F_1$ score is below a threshold), then a regression with respect to the accuracy at which the compute service detects anomalies in time series data may have occurred.

As an example of the problem addressed by the techniques herein, consider a deep machine learning-based anomaly detection compute service for time series data. The service provider might upgrade, change, or reconfigure the deep learning algorithms used for anomaly detection from time-to-time. Such updates, changes, or reconfigurations might be driven, for example, by user requirements or feedback received from users on the performance of current algorithms or models. It can be difficult to ensure that a given update, change, or reconfiguration will not only improve performance on the time series data of users setting requirements or providing feedback but that also will not cause a regression in performance on the time series data of other users that are satisfied with the current algorithms. Thus, in making such updates, changes, or reconfigurations there is a risk that some users satisfied with the service will become dissatisfied with the service. As such, the ability to quickly identify regressions in the accuracy of anomaly detection on users' time series data is very important.

The regression detection is not only important for the service provider, which seeks to avoid having dissatisfied users who may cancel accounts or service subscriptions, but also to the users themselves who may wish to monitor for accuracy regressions on their time series data where the existence of such regressions might indicate that the patterns, seasonality, or trends in the users' time series data has materially changed. Without regression detection, a regression may be unknowingly introduced to the anomaly detection compute service and require many person-hours later to recognize and detect. In the meantime, users may notice or become dissatisfied with the decreased anomaly detection accuracy of the service.

The techniques provide regression detection as well as the ability for users to customize regression detection for the particular characteristics of their time series data. Further, as alluded to above, the techniques can be applied to detect accuracy regressions with more than just machine learning-based approaches for anomaly detection in time-series data. They can be applied to other anomaly detection approaches such as simple thresholding, Kalman filtering, STL decomposition, etc.

The techniques herein use an instrumented time series approach in which an instrumented time series is instrumented with one or more predetermined anomalies. Each instrumented anomaly can be one that a user expects to be detected as an anomaly by the anomaly detection compute service. The anomaly detection service can then be applied to the instrumented time series to determine which anomalies, if any, are detected in the instrumented time series by the service.

The service can detect an anomaly in the instrumented time series that is one of the instrumented anomalies (true positive). The service can detect an anomaly that is not one of the instrumented anomalies (false positive). The service can fail to detect an instrumented anomaly (false negative). With this, the precision of the service on the instrumented time series can be computed as the fraction of the number of true positives of the sum of the number of true and false positives and the recall of the service on the instrumented time series can be computed as the fraction of the number of true positives of the number of instrumented anomalies. The accuracy of the service with respect to the instrumented time series can be computed from the precision and the recall (e.g., as a F-score or F-measure). If the anomaly detection accuracy of the service drops below a threshold accuracy, then an alert or notification can be generated or other remediation action may be taken such as, for example, rolling back (reversing) a recent change, upgrade, or configuration to the anomaly detection service.

The regression detection techniques can be repeated on regular intervals to continually monitor for regressions. Different instrumented time series can have different intervals. For example, the techniques can be repeated once every five minutes, once every ten minutes, once every hour, or once every day on a target instrumented time series. In some examples, the interval can be configured by the user for a target instrumented time series.

FIG. 1 illustrates an example provider network environment in which the regression techniques can be implemented. The environment includes provider network 100, set of one or more intermediate networks 170, and alert client 180. Provider network 100 includes monitoring service 110, on-demand code execution service 120, database service 130, object storage service 140, anomaly detection service 150, and notification and event service 160.

Monitoring service 110 includes regression detection alarm 111 (or "alarm 111") for short), set of one or more accuracy metrics 112, instrumented anomaly detection verifier event rule 113 (or "verifier rule 113" for short), instrumented anomaly generator event rule 114 (or "anomaly generator rule 114" for short), and instrumented time series generator event rule 115 (or "time series generator rule 115" for short).

On-demand code execution service 120 includes instrumented anomaly detection verifier 121 (or "verifier 121" for short), instrumented anomaly generator 122 (or "anomaly generator 112" for short), and instrumented time series generator 123.

Database service 130 includes set of one or more detected anomalies 131 and set of one or more instrumented anomalies 132.

Object storage service 140 includes instrumented time series 141.

Anomaly detection service 150 includes anomaly detector 151, set of one or more anomaly detection algorithms 152, and set of one or more anomaly detection models 153.

Notification and event service 160 includes messaging channel 161 which includes set of detected anomalies 131.

Steps of a method for accuracy regression detection for time series anomaly detection service 150 are depicted in FIG. 1 by numbered circles that label directional arrows. A directional arrow labeled by a step number that connects two respective components in FIG. 1 represents a direction of data flow between the components but not necessarily the exclusive direction.

The numbers assigned to the steps of the method depicted in FIG. 1 imply an ordering of the steps. It is not necessary, however, that the steps be performed strictly in the implied order and certain steps can be performed in a different order to perform the method in substantially the same way to achieve substantially the same result. Furthermore, the numbering of steps of the method in FIG. 1 is not meant to imply that a lowered numbered step must be completed before a higher numbered steps is initiated, and certain steps can be performed concurrently or in parallel with each other. For example, Steps 1, 2, and 3 can be started after Step 4 is started and, at Step 5, instrumented time series generator 123 can wait for Step 3 to start before starting Step 6.

The computing environment illustrated in FIG. 1 is just one example of a possible computing environment in which the techniques can be implemented. The techniques, however, are not limited to any particular computing environment. In particular, a provider network environment is not necessary to the techniques but is used to provide a framework for discussion. The techniques can be implemented in any type of computing environment capable of supporting the techniques, including single computing device implementations or the like.

The approach of the method of FIG. 1 can be to orchestrate, in an asynchronous event-driven manner, generating instrumented time series 141, analyzing instrumented time series 141 for anomalies by anomaly detection service 150, and comparing the anomalies detected 131 in the instrumented time series 141 by anomaly detection service 150 with the anomalies instrumented 132 in the instrumented time series 141 to determine the precision, recall, or accuracy with which anomaly detection service 150 detected the instrumented anomalies 132. The determined precision, recall, or accuracy can then be analyzed for regressions, for example, by comparing to a threshold. In some examples, the method is repeated to continuously monitor for regressions in the accuracy in detecting anomalies in instrumented time series 141. Furthermore, the method can be performed separately for different instrumented time series of which instrumented time series 141 is representative. For example, the method can be performed, possibly even repeatedly, for each of multiple instrumented time series for the same or for different users.

The method proceeds at Step 1 with an event that matches anomaly generator rule 114 of monitoring service 110 and triggers execution of anomaly generator 122 of on-demand code execution service 120.

At Step 2, execution of anomaly generator 122 is initiated.

At Step 3, set of instrumented anomalies 132 is created in database service 130 by the executing anomaly generator 122.

At Step 4, an event that matches time series generator rule 115 of monitoring service 110 triggers execution of instrumented time series generator 123 of on-demand code execution service 120.

At Step 5, execution of instrumented time series generator 123 is initiated.

At Step 6, the executing instrumented time series generator 123 obtains set of instrumented anomalies 132 from database service 130.

At Step 7, the executing instrumented time series generator 123 generates instrumented time series 141 based on the obtained set of instrumented anomalies 132 and stores instrumented time series 141 in object storage service 140.

At Step 8, instrumented time series 141 is input to anomaly detection service 150.

At Step 9, anomaly detection service 150 performs anomaly detection on the input instrumented time series 141 using set of anomaly detection algorithms 152 and set of anomaly detection models 153.

At Step 10, set of detected anomalies 131 detected in instrumented time series 141 by anomaly detection service 150 is published to messaging channel 161 of notification and event service 160.

At Step 11, database service 130, as a subscriber to messaging channel 161, creates set of detected anomalies 131 in database service 130 based on set of detected anomalies 131 published to messaging channel 161 by anomaly detection service 150.

At Step 12, an event matching verifier rule 113 triggers execution of verifier 121 of on-demand code execution service 120.

At Step 13, execution of verifier 121 is initiated.

At Step 14, executing verifier 121 queries set of detected anomalies 131 and set of instrumented anomalies 132 in database service 130.

At Step 15, executing verifier 121, based on the results of querying set of detected anomalies 131 and set of instrumented anomalies 132 in database service 130 at Step 14, outputs set of accuracy metrics 112 to monitoring service 110.

At Step 16, set of accuracy metrics 112 triggers alarm 111.

At Step 17, a notification about alarm 111 is sent by monitoring service 110 to alert client 180 via set of intermediate networks 170.

At Step 18, the notification about the alarm 111 is received at alert client 180.

As an example, consider a user of anomaly detection service 150 that is simultaneously running multiple digital advertising campaigns. The user may be confronted with many metrics to monitor for anomalies across all the campaigns. Some of the metrics to monitor might include, for example, clicks, impressions, conversions, installs, or advertising spend for each campaign. The user can use anomaly detection service 150 to monitor each metric during each campaign for anomalies to understand when a campaign is overspending, underperforming or has encountered an error, and to be alerted about mission critical incidents that impact the user's digital advertising spend. In addition, the service provider of anomaly detection service 150 or a user of anomaly detection service 150 can use the techniques disclosed herein to detect regressions in the accuracy with which anomaly detection service 150 detects anomalies in the user's campaign metrics.

Of course, anomaly detection service 150 is not limited to detecting anomalies only in digital advertising campaign time series. The accuracy regression detection techniques are not limited to detecting accuracy regressions only with respect to digital advertising campaign time series. The techniques disclosed herein can be used with virtually any type of time series.

Broadly speaking, a time series can be data that represents a series of time-ordered metrics. A metric can be data that represents a measure or data that represents a measure and a dimension of the measure. A measure can be data that represents a numerical value being monitored for anomalies (e.g., by anomaly detection service 150). A dimension can be data that represents a category of a measure.

Figure 2:
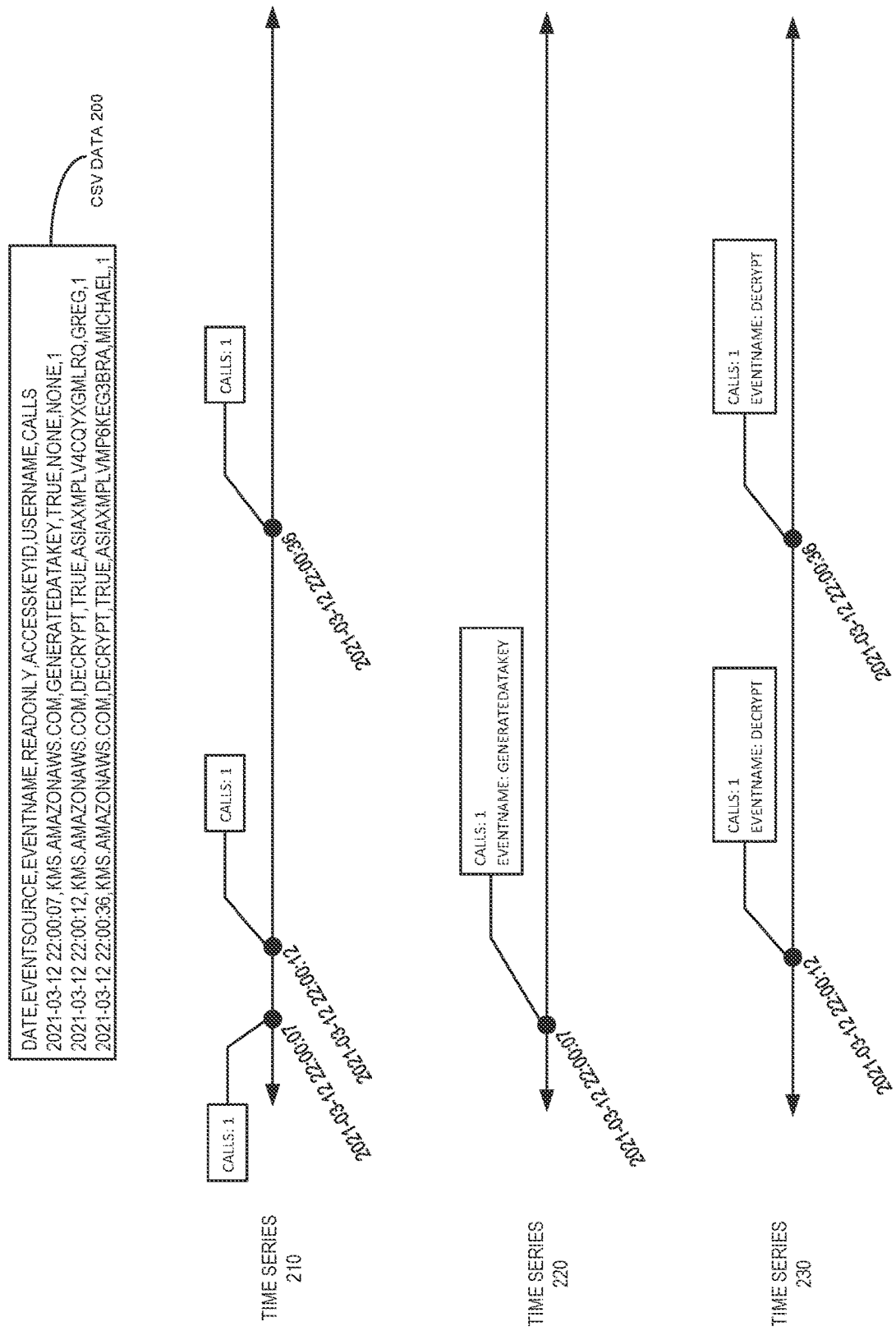
FIG. 2 illustrates example time series including example metrics, measures, and dimensions, according to some examples.

As an example, FIG. 2 illustrates example Comma Separated Value (CSV) data 200 encompassing different potential time series. While example CSV data 200 contains only three timestamped lines for the purpose of providing a clear example, a practical implementation can involve tens, hundreds, millions, or more timestamped lines. Additionally, a time series can be represented in data formats other than a CSV data format. For example, a time series can be represented in other machine and human readable data serialization data formats such as a JavaScript Object Notation (JSON) format or an extensible Markup Language (XML) format.

FIG. 2 depicts at least three potential time series 210, 220, and 230 based on CSV data 200. For each metric of time series 210, CALLS is the measure and there is no dimension. For the one metric in time series 220, CALLS is the measure and EVENTNAME is the dimension where EVENTNAME equals "GENERATEDATAKEY," which is one of the two distinct values of the EVENTNAME dimension in CSV data 200. For each metric in time series 230, CALLS is the measure and EVENTNAME is the dimension where EVENTNAME equals "DECRYPT," which is the other of the two distinct values of the EVENTNAME dimension in CSV data 200.

While in example CSV data 200 there is only one measure (CALLS) per timestamped line, a timestamp line can include multiple measures. Likewise, while example CSV data 200 has five dimensions per line (EVENTSOURCE, EVENTNAME, READONLY, ACCESSKEYID, USERNAME), a timestamped line can include more or fewer dimensions. For example, a timestamped line might include just a timestamp and one or more measures without any dimensions.

As depicted in FIG. 1, various different services of provider network 100 can be involved in carrying out the method including monitoring service 110, on-demand code execution service 120, database service 130, object storage service 140, anomaly detection service 150, and notification and event service 160.

Provider network 100 can be programmed or configured to adhere to a "cloud" computing model that enables ubiquitous, convenient, on-demand network access to a shared pool of configurable resources such as networks, servers, storage applications, and services. The resources can be rapidly provisioned and released with minimal management effort or service provider interaction. A user of provider network 100 can unilaterally provision computing capabilities in provider network 100, such as server time and network storage, as needed automatically without requiring human interaction with each service provider.

Capabilities of provider network 100 can be available over set of one or more intermediate networks 170 and accessed through standard mechanisms that promote use by heterogeneous thin or thick client platforms such as mobile phones, tablets, laptops, and workstations. Computing resources such as storage, processing, memory, and network bandwidth in provider network 100 can be pooled to serve multiple users using a multi-tenant model, with different physical and virtual resources dynamically assigned and reassigned according to user demand. There can be a sense of location independence in that the user generally can have no control or knowledge over the exact location of provided resources but can be able to specify location at a higher level of abstraction such as, for example, at the level of a country, state, or datacenter.

Provider network 100 can automatically control and optimize resource use by leverage a metering capability (e.g., on a pay-per-use or on a charge-per-use basis) at a level of abstraction appropriate to the type of service such as storage, processing, bandwidth, and active user accounts. Resource usage in provider network 100 can be monitored, controlled, and reported, providing transparency for both the provider and the user of a utilized service.

Provider network 100 can provide its capabilities to users according to a variety of different service models including Software-as-a-Service ("SaaS"), Platform-as-a-Service ("PaaS"), and Infrastructure-as-a-Service ("IaaS").

With SaaS, a capability can be provided to a user using the provider's software applications running on the infrastructure of provider network 100. The applications can be accessible from various client devices through either a thin client interface such as a web browser, or an API. The infrastructure can include the hardware resources such as server, storage, and network components and software deployed on the hardware infrastructure that are necessary to support the services being provided. Typically, under the SaaS model, the user does not manage or control the underlying infrastructure including network, servers, operating systems, storage, or individual application capabilities, except for limited user-specific application configuration settings.

With PaaS, the user can be provided the capability to deploy onto hardware and software infrastructure of provider network 100 user-created or acquired applications using programming languages, libraries, services, and tools supported by the provider or other sources. Typically, under the PaaS model, the user does not manage or control the underlying hardware and software infrastructure including network, servers, operating systems, or storage, but can have control over the deployed applications and possibly configuration settings for the application-hosting environment.

With IaaS, the user can be provided the capability to provision processing, storage, networks, and other fundamental computing resources where the user can deploy and run arbitrary software, which can include operating systems and applications. The user typically does not manage or control the underlying hardware and software infrastructure but can have control over operating systems, storage, and deployed applications and possibly limited control of selecting network components such as, for example, host firewalls.

Provider network 100 can provide its capabilities to a user according to a variety of different deployment models including as a private cloud, as a community cloud, as a public cloud, or as a hybrid cloud.

In a private cloud, the hardware and software infrastructure of provider network 100 can be provisioned for exclusive use by a single organization which can comprise multiple users (e.g., business units). The private cloud can be owned, managed, and operated by the organization, a third party, or some combination of them, and it can exist on or off premises.

In a community cloud, the hardware and software infrastructure of provider network 100 can be provisioned for exclusive use by a specific community of users from organizations that have shared concerns such as mission security requirements, policy, and compliance considerations. The community cloud can be owned, managed, and operated by one or more of the organizations in the community, a third party, or some combination of them, and it can exist on or off premises.

In a public cloud, the infrastructure can be provisioned for open use by the public. The public cloud can be owned, managed, and operated by a business, academic, or government organization, or some combination of them. A public cloud can exist on the premises of the public cloud provider.

In a hybrid cloud, the infrastructure can be a composition of two or more distinct cloud infrastructures (private, community, or public) that remain unique entities, but that can be bound together by standardized or proprietary technology that enables data and application portability such as, for example, cloud bursting for load balancing between clouds.

To provide resource services to user, provider network 100 can rely upon virtualization techniques. For example, virtualization technologies can provide users the ability to control or use compute resources (e.g., a "compute instance," such as a virtual machine (VM) using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by provider network 100 to perform a variety of computing tasks. Additionally, or alternatively, a user can indirectly use a compute resource by submitting code to be executed by provider network 100, which in turn can use one or more compute resources to execute the code-typically without the user having any control of or knowledge of the underlying compute instance(s) involved.

A user of provider network 100 can use a user account that is associated with a customer account, though these terms can be used somewhat interchangeably depending upon the context of use. A user can interact with provider network 100 across set of intermediate networks 170 (e.g., the Internet, a cellular network, etc.) via an interface, such as through use of an application programming interface (API) call, via a console implemented as a website or web application, etc.

An API can refer to an interface or communication protocol between a client and a server, such that if the client makes a request in a predefined format, the client can receive a response in a specific format or initiate a defined action. In context of provider network 100, an API can provide a gateway for a customer to access cloud infrastructure by allowing the customer to obtain data from or cause an action within provider network 100, enabling the development of an application that interacts with a resource or a service hosted in the provider network 100. An API can also enable a service of provider network 100 to exchange data with another service of provider network 100.

Monitoring service 110 can provide a user with data and actionable insights to monitor compute applications, respond to system-wide performance changes, and optimize computing resource utilization. Monitoring service 110 can collect monitoring and operational data in the form of logs, metrics, and events. Monitoring service 110 can provide a user with a unified view of systems operational health so that the user gains visibility of the user's computing resources, applications, and services running in provider network 100 or on-premises. Monitoring service 110 can allow a user to detect anomalous behavior in computing environments, set alarms, visualize log data and metrics side-by-side, take automated actions, troubleshoot issues, and discover insights to keep the user's computing applications running smoothly.

Monitoring service 110 can be a repository for set of regression metrics 112 that are generated by instrumented anomaly detection verifier 121. In some examples, monitoring service 110 can be a monitoring and observability compute service designed for developer-operations (devops) engineers, software developers, site reliability engineers, information technology (IT) managers, and product owners.

On-demand code execution service 120 can be a serverless, event-driven compute service that lets a user of provider network 100 or service in provider network 100 run code (software) for virtually any type of application or backend service without provisioning or managing servers. On-demand code execution service 120 can enable a user of provider network 100 or another service in provider network 100 (e.g., monitoring service 110) to execute code on provider network 100 compute resources without having to select or manage the underlying compute resources used to execute the code. For example, monitoring service 110 can use an API of on-demand code execution service 120 to request that on-demand code execution service 120 identify, provision, and manage the compute resources required to execute code such as instrumented verifier 121, anomaly generator 122, or instrumented time series generator 123.

Database service 130. In some examples, database service 130 can be a collection of compute services in provider network 100 that allow a user to setup, operate, and scale relational databases in service 130. Database service 130 can support a Structured Query Language (SQL)-based relational database engine such as, for example, an AMAZON AURORA, MYSQL, POSTGRESQL, ORACLE, or MICROSOFT SQL SERVER compatible relational database engine or the like. While in some examples database service 130 is a SQL-based database service, database service 130 is a NOSQL-based or non-relational database service in other examples. For example, database service 130 can be a key-value database service such as AMAZON DYNAMODB, AZURE COSMOS DB, ORACLE NOSQL DATABASE, or the like.

Object storage service 140. In some examples, object storage service 140 offers data object storage through an API. A basic data storage unit of service 140 can be an object which can be organized into "buckets." Each object can be identified by a unique key. Service 140 can also provide access control, encryption, and replication at the bucket layer or on a per-object basis.

Anomaly detection service 150 can use set of anomaly detection algorithms 152 and set of anomaly detection models 153 (which may or may not be machine learning-based) to automatically detect and diagnose anomalies (e.g., outliers from the norm) in time series data such as, for example, a sudden dip sales revenue or customer acquisition rates. An anomaly can be viewed as a data point in a time series that is an outlier. An outlier is a data point that does not follow an expected pattern of the time series. An outlier can be an unwanted data point such as a noisy or erroneous data point that by itself may not be interesting or informative to an analysis of the time series. Detecting noisy or erroneous anomalies can be important so that they are deleted or corrected or otherwise accounted for by downstream analysis of the time series. An outlier can also be an event of interest. For example, detecting anomalies can be an important aspect in fraud detection. Here, an outliers may not be noisy or erroneous but rather an unusual event that might be indicative of fraud.

One type of anomaly that can be detected by anomaly detection service 150 and that can be instrumented into instrumented time series 141 using techniques disclosed herein is a point anomaly. A point anomaly can be an unusual data point at a specific time instance when compared to other data points in the time series (e.g., a global anomaly), or to its neighboring data points in the time series (e.g., local anomaly).

Another type of anomaly that can be detected by anomaly detection service 150 and that can be instrumented into instrumented time series 141 using techniques disclosed herein is a subset anomaly. A subset anomaly is an unusual set of consecutive data points of a time series where any one individual data point in the subset might not be a point anomaly. A subset anomaly can be a global anomaly or a local anomaly.

Depending on the complexity of instrumented time series 141, anomaly detection service 150 can use various different anomaly detection algorithms 152 or various different anomaly detection models 153 to detect anomalies in instrumented time series 141.

For example, anomaly detection service 150 can use a thresholding technique that is based on a specific predefined value or based on the value different in a moving window over instrumented time series 141.

As another example, anomaly detection service 150 can use a filtering technique that performs a posterior prediction using a Kalman filter.

As yet another example, anomaly detection service 150 can use seasonal-trend decomposition procedure based on LOESS which is sometimes called "STL decomposition." STL decomposition can be used by anomaly detection service 150 to isolate seasonal, trend, and residue parts of instrumented time series 141. A thresholded analysis of the deviation of the residue part can be performed by anomaly detection service 150 to detect anomalies in instrumented time series 141.

As yet another example, anomaly detection service 150 can use a classification and regression tree (CART) technique to detect anomalies in instrumented time series 141. A CART technique can use a supervised learning approach using xgboost, random forest, or decision trees. Alternative, a CART technique can use an unsupervised learning approach using an isolation forest.

As yet another example, anomaly detection service 150 can use a time-series forecasting technique to detect anomalies in instrumented time series 141 by applying a thresholding mechanism on a difference between a predicted value and an actual value. For example, an algorithm 152 can be an Autoregression Integrated Moving Average (ARIMA) regression analysis algorithm that uses an ARIMA statistical model 153. Or a time-series forecasting algorithm 152 and model 153 can be machine learning-based such as, for example, based on AR-NET or an LSTM.

As another example, anomaly detection service 150 can use a dimensionally reduction technique to detect anomalies in instrumented time series 141 where an algorithm 152 is a dimensionality reduction algorithm such as Principal Component Analysis (PCA) or a clustering algorithm.

While some examples of possible anomaly detection algorithms 152 and models 153 that can be used by anomaly detection service 150 to detect anomalies in instrumented time series 141 (and other time series) are referenced herein, it should be understood that anomaly detection service 150 and the regression techniques disclosed herein are not limited to any particular anomaly detection algorithm or model. Broadly speaking, the regression technique disclosed herein can be used with any number of different possible anomaly detection techniques for time series data that might be employed by anomaly detection service 150 include predictive confidence level approaches (e.g., ARIMA, SARIMA, GARCH, VAR, or a regression or machine learning or deep machine learning approach), statistic profiling approaches, or unsupervised clustering approaches.

Notification and event service 160. In some examples, notification and event service 160 can be a managed messaging service for both application-to-application and application-to-user communication. Service 160 can provide application-to-application publish and subscription messaging functionality for high-throughput, push-based, many-to-many messaging between distributed computing systems, microservices, and event-driven serverless applications.

A regression metric of set of regression metrics 112 can be data that represents a numerical value where the numerical value represents the precision, recall, or accuracy with which anomaly detection service 150 detected set of instrumented anomalies 132 in instrumented time series 141 as reflected by set of detected anomalies 131. Set of regression metrics 112 can be a time series where a new regression metric is added to the time series by verifier 121 on a regular interval which is referred to herein as the "anomaly detection verification interval," or just "verification interval." The new regression metric can reflect the anomaly detection precision, recall, or accuracy of anomaly detection service 150 on instrumented time series 141. In some examples, the verification interval is three hours but can be shorter or longer according to the requirements of the particular implementation at hand. In some examples, the verification interval can be configured by a user either via a graphical user interface or other computer user interface or via an API of provider network 100.

Verifier rule 113 can embody the verification interval. For example, verifier rule 113 can be implemented by monitoring service 110 as a cron job or other scheduled task that is scheduled to execute on the verification interval (e.g., every three hours). On the verification interval, verifier rule 113 can be executed. An execution verifier rule 113 can trigger an execution of verifier 121 by on-demand code execution service 120. For example, verifier rule 113 can trigger the execution of verifier 121 by on-demand code execution service 120 via an API offered by on-demand code execution service 120 to monitoring service 110 and possibly offered to other services in provider network 100.

When executed, verifier 121 can calculate a regression metric based on set of detected anomalies 131 and set of instrumented anomalies 132 stored by database service 130. The calculated regression metric can be a precision metric, a recall metric, or an accuracy metric. If a precision metric, the precision metric can be calculated as a ratio of the number of true positives detected by anomaly detection service 150 with respect to instrumented time series 141 over the sum of the number of true positives and the number of false positives detected by anomaly detection service 150 with respect to instrumented time series 141. If a recall metric, the recall metric can be calculated as a ratio of the number of true positives over the sum of the number of true positives and the number of false negatives with respect to instrumented time series 141. If an accuracy metric, the accuracy metric can be calculated as an F-measure as a function of the precision metric and the recall metric. For example, the F-measure can be an $F_1$ score or an $F_\beta$ score. The number of true positives (TP) can be calculated as the number of instrumented anomalies 132 that are detected by anomaly detection service 150 in instrumented time series 141 as reflected by detected anomalies 131. The number of false positives (FP) can be calculated as the number of anomalies detected by anomaly detection service 150 in instrumented time series 141 as reflected by detected anomalies 131 that are not in set of instrumented anomalies 132. The number of false negatives (FN) can be calculated as the number of instrumented anomalies 132 that are not detected by anomaly detection service 150 as reflected by detected anomalies 131.

More formally, the precision metric can be represented as:

$$Precision = \frac{TP}{TP + FP}$$

The recall metric can be represented as:

$$Recall = \frac{TP}{TP + FN}$$

The $F_1$ score can be represented as:

$$F_1 = 2 * \frac{Precision * Recall}{Precision + Recall}$$

In the above $F_1$ score expression, precision and recall are weighted equally. The FB score can be used to weight precision and recall differently in the accuracy calculation according to the requirements of the particular implementation at hand. The FB score can be represented as:

$$F_\beta = (1 + \beta^2) * \frac{Precision * Recall}{(\beta^2 * Precision) + Recall}$$

While in some examples, accuracy is calculated as an F-measure (e.g., as an $F_1$ score or an $F_\beta$ score), accuracy is computed as the following measure of all the correctly detected instrumented anomalies according to set of detected anomalies 131 and set of instrumented anomalies 132:

$$\text{Accuracy} = \frac{TP}{TP + FP + FN}$$

In the above expression, accuracy is calculated as the ratio of (A) the number of true positives according to set of detected anomalies 131 and set of instrumented anomalies 132 over (B) the sum of true positives, false positives, and false negatives according to set of detected anomalies 131 and set of instrumented anomalies 132.

Figure 3:
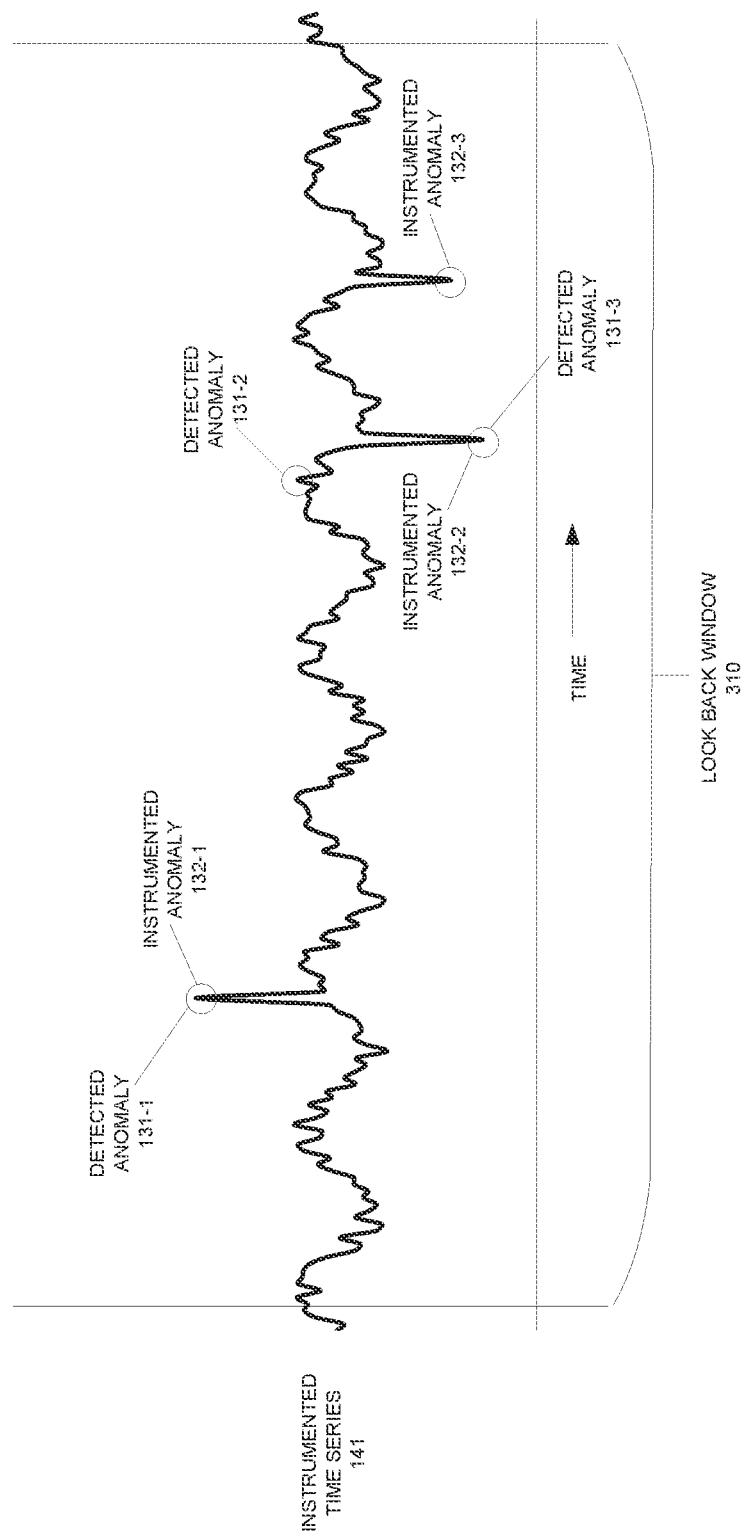
FIG. 3 illustrates an example of detected anomalies and instrumented anomalies with respect to an instrumented time series, according to some examples.

FIG. 3 illustrates an example of set of detected anomalies 131 and instrumented anomalies 132 with respect to instrumented time series 141. Verifier 121, when executed, can calculate a regression metric with respect to set of detected anomalies 131 and set of instrumented anomalies 132 within look back window 310 of instrumented time series 141. Look back window 310 represents the time portion of instrumented time series 141 that is analyzed for regressions on a given verification interval. Look back window 310 can be a period of time having a duration that equals the verification interval. For example, if the verification interval is three hours, then the duration of look back window 310 can also be three hours. However, it is also possible for the duration of look back window 310 to be longer or shorter than the verification interval according to the requirements of the particular implementation at hand. In some examples, the duration of look back window 310 is configurable by a user either via a graphical user interface or other computer user interface or via an API of provider network 100.

Some or all set of detected anomalies 131 and set of instrumented anomalies 132 can be within look back window 310. In the simple example illustrated in FIG. 3, detected anomalies 131-1, 131-2, and 131-3 and instrumented anomalies 132-1, 132-2, and 132-3 are within look back window 310. Detected anomalies 131-1 and 131-3 are examples of true positives as they are also instrumented anomalies 132-1 and 132-2, respectively. Detected anomaly 131-2 is an example of a false positive because it is also not an instrumented anomaly. Instrumented anomaly 132-3 is an example of a false negative as it is also not a detected anomaly. It should be emphasized that FIG. 3 is merely an example and instrumented time series 141 is not limited to the time series illustrated in FIG. 3, nor are set of detected anomalies 131 and set of instrumented anomalies 132 limited to the examples illustrated in FIG. 3.

Monitoring service 110 can be configured with regression detection alarm 111. Alarm 111 can perform one or more actions based on set of accuracy metrics 112 relative to a threshold over a number of time periods. An action can be sending a notification to messaging channel of notification and event service 160, for example.

Regression detection alarm 111 can be applied by monitoring service 110 to set of accuracy metrics 112. Alarm 111 can be configured to watch (evaluate) set of accuracy metrics 112 over a period of time for regressions. In some examples, set of accuracy metrics 112 is generated based on applying a math expression to sets of metrics provided by instrumented anomaly detection verifier 121. For example, on each verification interval, instrumented anomaly detection verifier 121 can provide a precision metric and a recall metric pair to monitoring service 110 that verifier 121 calculates based on set of detected anomalies 131 and set of instrumented anomalies 132. Over multiple verification intervals, verifier 121 can provide a set of precision metrics and a set of recall metrics. Monitoring service 110 can calculate set of accuracy metrics 112 from the set of precision and the set of recall metrics by applying a math expression (e.g., a $F_1$ or $F_\beta$ score expression) to each precision and recall pair provided by verifier 121. In addition, or alternatively, verifier 121 can apply the math expression to provide set of accuracy metrics 112 to monitoring service 110.

As well as the alarm threshold, alarm 111 can encompass a set of user-configurable parameters including a "period" parameter, an "evaluation period" parameter, and a "datapoints to alarm" parameter. In some examples, one or more of these parameters are configurable by a user either via a graphical user interface or other computer user interface or via an API of provider network 100.

The period parameter can be a length of time (interval) for monitoring service 110 to evaluate set of accuracy metrics 112 to create an individual data point for alarm 111. The evaluation period parameter can be a number of periods (e.g., a number of individual data points of alarm 111) for monitoring service 110 to evaluate when determining a state of alarm 111. Alarm 111 can be in different states. In an "OK" state, set of accuracy metrics 112 is within a defined threshold. In an "ALARM" state, set of accuracy metrics 112 is outside the defined threshold. The "OK" state can correspond to the absence of a detected regression and the "ALARM" state can correspond to a detected regression. The datapoints to alarm parameter can be a number of individual data points of alarm 111 within an evaluation period that must be outside the threshold (breaching) in order to cause alarm 111 to transition to the ALARM (regression) state. In some examples, the breaching data points within the evaluation period do not need to be consecutive but do need to all be within the evaluation period.

Figure 4:
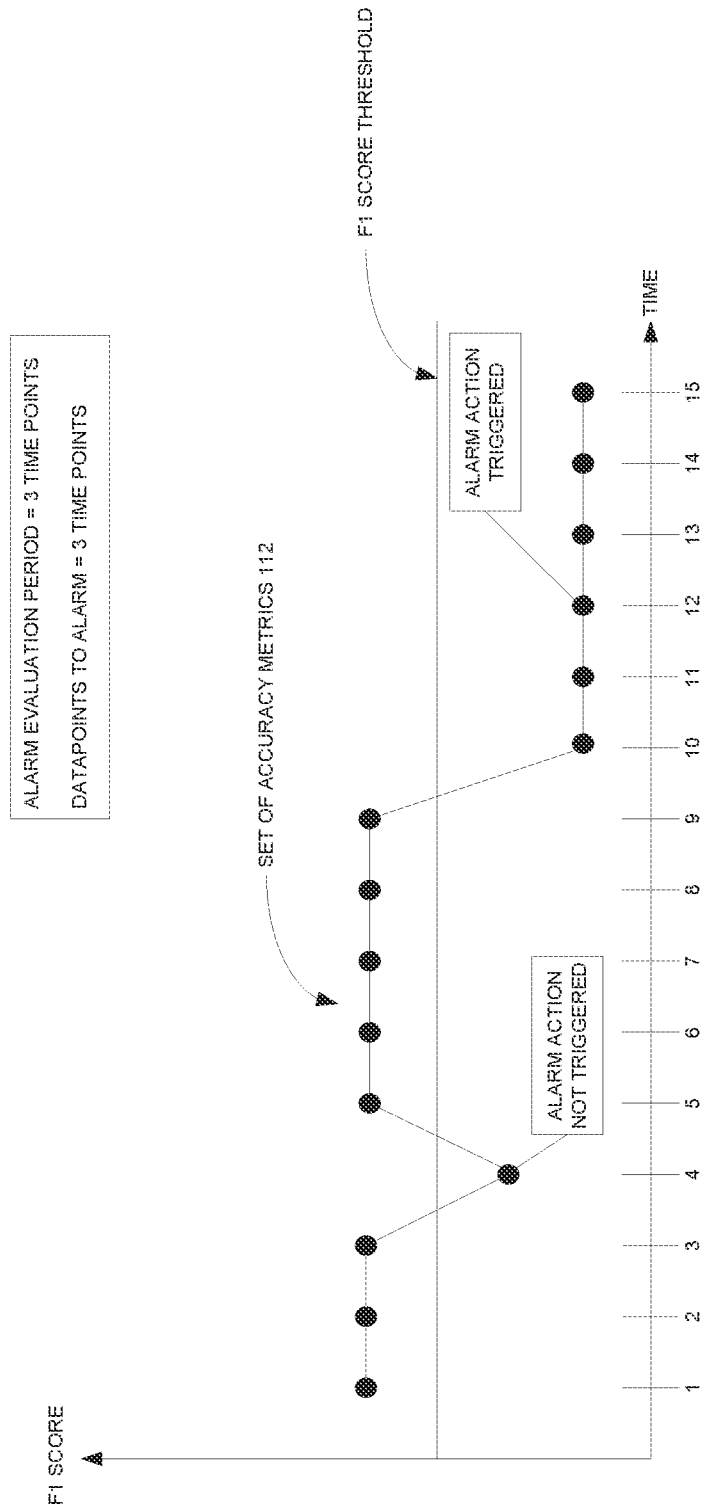
FIG. 4 illustrates an example operation of a regression detection alarm, according to some examples.

FIG. 4 illustrates an example operation of alarm 111. In this example, each of accuracy metrics of set of accuracy metrics 112 is an $F_1$ score and both evaluation period and datapoints to alarm are set to three time points. In this example, alarm 111 is in the OK (no regression) state for time points 1 through 11. This includes time point 4 because only one datapoint is below the $F_1$ score alarm threshold. However, alarm 111 transitions from the OK state to the ALARM state at time point 12 and remains in the ALARM state for time points 13, 14, and 15. Again, it should be emphasized that FIG. 4 is merely an example and set of accuracy metrics 112 is not limited to the example time series illustrated in FIG. 4, nor are the evaluation period parameter, the datapoints to alarm parameter, or the $F_1$ score threshold limited to the examples illustrated in FIG. 4.

Alarm 111 can be configured as an M out of N alarm where M represents the datapoints to alarm parameter and N represents the evaluation period parameter. The evaluation interval can be the number of data points multiplied by the period parameter. For example, if alarm 111 is configured as 4 (M) out of 5 (N) data points with a period of 3 hours, then the evaluation interval is 15 hours. As another example, if alarm 111 is configured as 3 (M) out of 3 (N) data points with a period of three hours, then the evaluation interval is 9 hours.

At time point 12, an alarm action can be triggered such as publishing a notification to a messaging channel of notification and event service 160. The messaging channel can be associated with a user or a set of users of provider network 100. A subscriber to the messaging channel can receive the published notification and take various actions. For example, the subscriber can be an electronic messaging service such as an e-mail service or a text messaging service that sends the notification to the user or one or more the set of users associated with the messaging channel. For example, the e-mail message or the text message notification can be received by alert client 180 which can be the personal computing device of the user or one of the set of users associated with the messaging channel. The notification can indicate set of accuracy metrics 112 dropped below the $F_1$ score alarm threshold according to alarm 111 at time point 12. The user receiving the notification can take various additional actions. For example, if the user is responsible for operating or administering anomaly detection service 150, the user can investigate potential causes of the regression. For example, the user might determine that an upgrade, change, or reconfiguration was made to one or more of anomaly detection algorithms 152 or one or more anomaly detection models 153 between time points 9 and 10. In this case, the user can reverse (roll back) the upgrade, change, or reconfiguration to the previous version(s) of the algorithm(s) or model(s).

Other subscribers to the messaging channel other than an e-mail service or a text messaging service that subscribe to the messaging channel in addition to or instead of the e-mail service or the text messaging service are possible. For example, a subscriber to the messaging channel, upon receiving the notification, might be a computing process or system in provider network 100 that causes code to be executed by on-demand execution service 120 that automatically rolls back or reverses a recent (e.g., the most recent) version-controlled change, upgrade, or reconfiguration to one or more of algorithms 152 or one or more models 153.

In some examples, monitoring service 110 can drive a graphical user interface dashboard that is displayed at alert client 180. The dashboard can allow the user of alert client 180 to view a chart of set of accuracy metrics 112 such as one like that illustrated in FIG. 4. From the chart, the user can discern the accuracy threshold and when, over a period of time of the chart, set of accuracy metrics 112 dropped below (outside) the threshold, including which data points, if any, that triggered an alarm 111 action.

Anomaly generator rule 114 can embody an instrumented anomaly generation interval (or "anomaly generation interval"). The anomaly generation interval can represent how often new instrumented anomalies can be generated by anomaly generator 122. For example, the anomaly generation interval can be ten minutes or other suitable time interval according to the requirements of the particular implementation at hand.

In some examples, the anomaly generation interval can be selected by a user based on the interval between data points of instrumented time series 141. For example, the instrumented anomaly generation interval can be selected such that it is at least as long as the interval between data points of instrumented time series 141. For example, if the interval between data points of instrumented time series 141 is ten minutes, then the anomaly generation interval might also be ten minutes or an integer multiple of the interval between data points of instrumented time series 141. In some examples, the anomaly generation interval can be configured by a user either via a graphical user interface or other computer user interface or via an API of provider network 100.

Anomaly generator rule 114 can be implemented by monitoring service 110 as a cron job or other scheduled task that is scheduled to execute repeatedly on the anomaly generation interval (e.g., every ten minutes). On the anomaly generation interval, anomaly generator 122 can be executed. An execution of anomaly generator rule 114 by monitoring service 110 can trigger an execution of anomaly generator 122 by on-demand code execution service 120. For example, anomaly generator rule 114 can trigger the execution of anomaly generator 122 by on-demand code execution service 120 via an API offered by on-demand code execution service 120 to monitoring service 110 and possibly offered to other services in provider network 100.

When executed, anomaly generator 122 can generate one or more instrumented anomalies and add the generated anomalies to set of instrumented anomalies 132 in database service 130. An instrumented anomaly generated by instrumented anomaly generator 122 can encompass a magnitude parameter and a timestamp parameter. The magnitude parameter can be a numerical value that specifies a percentage increase or percentage decrease or an absolute value increase or absolute value decrease relative to a baseline value of instrumented time series 141. The timestamp parameter represents the timestamp for the instrumented anomaly data point in instrumented time series 141.

Anomaly generator 122 can operate in conjunction with time series generator 123 to generate instrumented time series 141. In particular, anomaly generator 122 can generate set of instrumented anomalies 132 in database service 130. Time series generator 123 can generate a baseline values of instrumented time series 141. Based on the timestamps of instrumented anomalies 132 generated by anomaly generator 122, time series generator 123 can replace or substitute corresponding baseline values with instrumented anomalies 132 to produce instrumented time series 141 with set of instrumented anomalies 132.

Time series generator event rule 115 (or "time series generator rule") can embody an instrumented time series generation interval. The instrumented time series generation interval can represent how often new data points of instrument data series 141 can be generated by time series generator 123. For example, the instrumented time series generation interval can be ten minutes or other suitable time interval according to the requirements of the particular implementation at hand.

In some examples, the instrumented time series generation interval can be selected by a user based on the interval between data points of instrumented time series 141 or based on the length of anomaly generation interval. For example, the instrumented time series generation interval can be selected such that it is at least as long as the interval between data points of instrumented time series 141. For example, if the interval between data points of instrumented time series 141 is ten minutes, then the instrumented time series generation interval might also be ten minutes or an integer multiple of the interval between data points of instrumented time series 141. In some examples, the instrumented time series generation interval can be configured by a user either via a graphical user interface or other computer user interface or via an API of provider network 100.

Time series generation rule 115 can be implemented by monitoring service 110 as a cron job or other scheduled task that is scheduled to execute repeatedly on the instrumented time series generation interval (e.g., every ten minutes). On the instrumented time series generation interval, time series generator 123 can be executed. An execution of time series generator rule 115 by monitoring service 110 can trigger an execution of time series generator 123 by on-demand code execution service 120. For example, time series generator rule 115 can trigger the execution of time series generator 123 by on-demand code execution service 120 via an API offered by on-demand code execution service 120 to monitoring service 110 and possibly offered to other services in provider network 100.

When executed, time series generator 123 can generate a set one or more data points of instrumented time series 141 in object storage service 140. The set of generated data points can include one or more instrumented anomalies of set of instrumented anomalies 132 previously generated by anomaly generator 122. When stored in object storage service 140, instrumented time series 141 can be formatted as CSV data (e.g., like CSV data 200 of FIG. 2), XML data, JSON data, or the like.

Instrumented time series 141 as generated by times series generator 123 may encompass a set of data points that are a mix of baseline (non-anomalous) data points generated by time series generator 123 and anomalies data points generated by anomaly generator 122 and incorporated into instrumented time series 141 by time series generator 123.

On an anomaly generation interval, anomaly generator 122 can generate one or more instrumented anomalies to be inserted by a subsequent execution of time series generator 123 as anomalies into a baseline time series that is generated by time series generator 123. In some examples, the anomaly generation interval and the instrumented time series generation interval are the same duration and staggered. By staggering the intervals, an instrumented anomaly to be included in instrumented time series 141 at a particular time point can exist in set of instrumented anomalies 132 in database service 130 before time series generator 123 generates a data point for the particular time point. When time series generator 123 is executed on the instrumented time series generation interval, time series generator 123 can read the instrumented anomaly from database service 130 and include it at the particular time point in instrumented time series 141.

Figure 5:
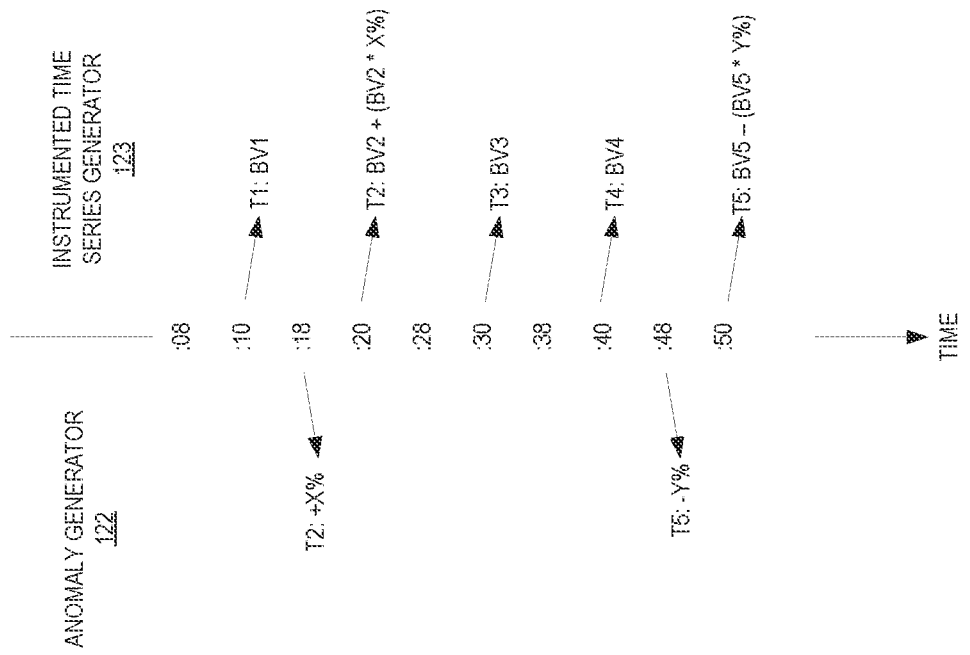
FIG. 5 illustrates an example of staggering anomaly generation and time series generation intervals, according to some examples.

FIG. 5 illustrates an example of staggering anomaly generation interval and the instrumented time series generation interval, according to some examples. In this example, both the anomaly generation interval and the instrumented time series generation interval are ten minutes. However, the anomaly generation interval starts two minutes earlier than the instrumented time series generation interval.

In particular, at time: 08 anomaly generation rule 114 is triggered and causes execution of anomaly generator 122. During this execution, anomaly generator 122 determines not to generate an instrumented anomaly data point for the next time point T1 in instrumented data series 141. For example, anomaly generator 122 can encompass a weighted coin flipping algorithm based on a random number generator. Anomaly generator 122 can flip the coin when executed to determine whether to generate an instrumented anomaly data point for the next time point in instrumented time series 141. The coin flipping algorithm can be weighted such that it is more likely (e.g., much more likely) for anomaly generator 122 to determine not to generate an instrumented anomaly for a given coin flip. Nonetheless, over multiple anomaly generation intervals, use of the coin flipping algorithm can have the effect of inserting anomalies into instrumented time series 141 at random time points as can be the nature of actual anomalies in time series data. Alternatively, anomaly generator 122 can determine to generate instrumented anomalies over multiple anomaly generation intervals according to a predetermined pattern such as a predetermined seasonality pattern.

At time: 10, time series generator 115 is triggered and causes execution of time series generator 123. Since anomaly generator 122 did not generate an instrumented anomaly for time point T1, time series generator 123 generates time point T1 with a baseline (non-anomalous) value BV1 for inclusion in instrumented time series 141.

At time: 18, anomaly generation rule 114 is triggered again on the anomaly generation interval and causes execution of anomaly generator 122. Anomaly generator 122 generates an instrumented anomaly for time point T2 with a percentage increase over baseline of X %. The numerical value X can be predetermined by anomaly generator 122 or randomly selected within a range. The value X can have a sufficient magnitude such that when applied to a baseline value of instrumented time series 141 it results in an anomalous data point. What is anomalous can vary according to the requirements of the particular implementation at hand including the type of instrumented time series 141. For example, if instrumented time series 141 represents a stock price, then an increase of 50% or more on a single trading day might be considered anomalous.

At time: 20, time series generation rule 115 is triggered again on the instrumented time series generation interval and causes execution of time series generator 123. This time, since an instrumented anomaly for time point T2 is included in set of instrumented anomalies 132, time series generator 123 generates time point T2 for inclusion in instrumented time series 141 as an instrumented anomaly. The resulting value is a baseline value BV2 for the time point T2 generated by time series generator 123 with a X percentage increase added. The baseline value BV2 can a non-anomalous value that time series generator 123 would otherwise include in instrumented time series 141 at time point T2. Alternatively, the baseline value BV2 can be a trend value or a normal value or other baseline value suitable for the requirements of the particular implementation at hand including the type of instrumented time series 141.

At time: 28, anomaly generation rule 114 is triggered again on the anomaly generation interval and causes execution of anomaly generator 122. On this interval instance, anomaly generator 122 determines not to generate an instrumented anomaly for time point T3 of instrumented time series 141.

At time: 30, time series generation rule 115 is triggered again on the instrumented time series generation interval and causes execution of time series generator 123. Since anomaly generator 123 did not generate an instrumented anomaly for time point T3, time series generator 123 generates time point T3 with a baseline (non-anomalous) value BV3 for inclusion in instrumented time series 141.

At time: 38, anomaly generation rule 114 is triggered again on the anomaly generation interval and causes execution of anomaly generator 122. On this interval instance, anomaly generator 122 determines not to generate an instrumented anomaly for time point T4 of instrumented time series 141.

At time: 40, time series generation rule 115 is triggered again on the instrumented time series generation interval and causes execution of time series generator 123. Since anomaly generator 123 did not generate an instrumented anomaly for time point T4, time series generator 123 generates time point T4 with a baseline (non-anomalous) value BV4 for inclusion in instrumented time series 141.

At time: 48, anomaly generation rule 114 is triggered again on the anomaly generation interval and causes execution of anomaly generator 122. On this interval instance, anomaly generator 122 determines to generate an instrumented anomaly for time point T5 of instrumented time series 141.

At time: 50, time series generation rule 115 is triggered again on the instrumented time series generation interval and causes execution of time series generator 123. Since anomaly generator 122 did generate an instrumented anomaly for time point T5, time series generator 123 generates time point T5 with an instrumented anomaly for inclusion in instrumented time series 141.

While in the example of FIG. 5 only at most a single anomaly data point is generated on the anomaly generation interval, multiple anomaly data points can be generated on such an interval. For example, an execution of anomaly generator 122 can generate multiple data points of a subset anomaly to be instrumented into instrumented time series 141.

While in the example of FIG. 5 only a single data point of instrumented time series 141 is generated on the instrumented time series general interval, multiple data points can be generated by a single execution of time series generator 123.

While in the example of FIG. 5 instrumented anomalies are generated by anomaly generator 122 in terms of a percentage increase or a percentage decrease from a baseline value, instrumented anomalies can be generated by anomaly generator 122 in other ways. For example, an instrumented anomaly can be generated as a magnitude increase or a magnitude decrease relative to a baseline value. Alternatively, an instrumented anomaly can be generated as a substitute value for a baseline view. In this case, time series generator 123 simply uses the generated substitute value at the specified time point in the instrumented time series 141 instead of calculating a time point value based on a baseline value. As yet another alternative, an instrumented anomaly can be generated by anomaly generator 122 as a Boolean value which indicates whether an anomaly is to be inserted into instrumented time series 141 at the specified time point. In this case, time series generator 123 can generate the actual anomalous value to insert into the instrumented time series 141 at the specified time point.

Anomaly detection service 150 can be configured to find anomalies in instrumented time series 141. Anomaly detector 151 can be created with service 150 to monitor instrumented time series 141 for anomalies. Anomaly detector 151 can be configured with an interval that determines how often detector 151 imports time series data of instrumented time series 141 from object storage service 140 and analyzes the time series data for anomalies. In some examples, the interval can range from 5 minutes to 1 day.

When service 150 finds an anomaly in instrumented time series 141, it can output a severity score. The severity score can indicate how unexpected the detected anomaly is based on detector 151's understanding of instrumented time series 141. Detector 151 can be a resource of service 150 that monitors instrumented time series 141 and identifies anomalies. Detector 151 can use machine learning algorithms 152 and models 153 to find patterns in instrumented time series 141 and to distinguish between expected variations and legitimate anomalies. Detector 151 can learn about instrumented time series 141 over time. Detector 151 can be configured with an interval to tell detector 151 how often to analyze instrumented time series 141 for anomalies. In some examples, a detector interval can range from 5 minutes to 1 day. At the end of each detector interval, detector 151 can look for anomalies in a set of timestamp data points of instrumented time series 141 from the interval.

Time series generator 123 can continually add new time series data points to instrumented time series 141 on the time series generation interval. These time series data points that time series generator 123 adds to instrumented time series 141 can contain instrumented anomalies among baseline data points and is referred to as "continuous" time series data points. Instrumented time series 141 can also encompass "historical" time series datapoints. Typically, the historical time series data points do not contain instrumented anomalies. At the outset, detector 151, including algorithm(s) 152 and model(s) 153, can learn the baseline patterns of instrumented time series 141 from the historical time series data points. That is, the historical data points can encompass expected, non-anomalous data points that represent the baseline patterns of instrumented time series 141. Once the baseline learn patterns are learned by detector 151, then the algorithm(s) 152 and model(s) 153 can be applied to continuous time series data points which may be instrumented with anomalous data points. Detector 151 can look for anomalies in the continuous data points.

Detector 151 can encompass a number of user-configurable parameters. Each such parameter can be configured by a user either via a graphical user interface or other computer user interface or via an API of provider network 100. One parameter can be the detector interval, which is the amount of time between attempts by detector 151 to detect anomalies in instrumented time series 141. At each attempt, detector 151 can analyze the most recent data points of instrumented time series 141 within the detector interval. For example, if the detector interval is one hour, then at each attempt by detector 151 to detect anomalies, the most recent hour's worth of data points of instrumented time series 141 can be analyzed for anomalies. Another parameter can be the anomaly severity threshold. The anomaly severity threshold can determine which detected anomalies are published as notifications to messaging channel 161 of notification and event service 160. Anomalies detected by service 150 with a severity score that are below the severity threshold are not published to messaging channel 161 while anomalies detected by service 150 with a severity score above the severity threshold are published to messaging channel 161. The anomalies published to messaging channel 161 can determine which detected anomalies are recorded as such in database service 130 as part of set of detected anomalies 131. In some examples, the severity score is a numerical value within a range (e.g., 0 to 1 or 1 to 100) where higher values in the range correspond to greater severity (i.e., more unexpected) and lower values in the range correspond to less severity (i.e., less unexpected).

Anomalies detected by service 150 in instrumented time series 141 can be published to messaging channel 161 of notification and event service 160. Notification and event service 160 can be a channel-based publish-subscription system and event-driven computing service for asynchronous application-to-application or service-to-service communication. Service 160 can support event-driven computing in which "subscriber" services or just "subscribers" automatically perform work in response to events triggered by "publisher" services or just "publishers." In an embodiment, anomaly detection service 150 is a publisher of anomalies detected in instrumented time series 141 and database service 130 is a subscriber to the published anomalies.

Notification and event service 160 can allow a publisher to publish an event message to a subscriber using message channels or channels. A "channel" is like a message queue in that is an asynchronous service-to-service communication mechanism in which event messages are stored in the channel until they are processed and deleted. However, a channel can differ from a message queue in some ways depending on the type of channel.

Notification and event service 160 supports at least two different types of channels, either of which can be used in an implementation of the disclosed techniques. The two different types of channels are termed herein "standard" and "FIFO." With a standard channel, event messages can be delivered by service 160 to database service 130 as a subscriber in a different order than the order in which they were published to the standard channel by anomaly detection service 150. In other words, for a standard channel, service 160 can make a best effort but not guarantee to deliver event messages in the same order in which they were published to the message channel. Furthermore, with a standard channel, an event message can be delivered more than once to database service 130. In other words, for a standard channel, service 160 can make a best effort but not guarantee to deliver only one copy of a published event message to database service 130. Another type of message channel is a FIFO channel. A FIFO channel is like a standard channel except that first-in-first-out ordering is guaranteed by service 160 and event message deduplication within a sliding window of time can be provided by service 160. Channel 161 can be either a standard-type or FIFO-type messaging channel.

A detected anomaly published to channel 161 by service 150 can contain data representing various information about the detected anomaly. The information can include the timestamp of a data point in instrumented time series 141 where the anomaly is detected. The information can also include the severity score for the detected anomaly. The information can also include the anomalous measure (value) of the data point.

Upon receiving a detected anomaly as a subscriber to channel 161, database service 130 can store the information about the detected anomaly as part of set of detected anomalies 131. Verifier 121 can query set of detected anomalies 131 and set of instrumented anomalies 132 to determine if each and every instrumented anomaly within a look back window of set of instrumented anomalies 132 is in set of detected anomalies 131. Verifier 121 can also query set of detected anomalies 131 and set of instrumented anomalies 132 to identify any detected anomalies within the look back window of set of detected anomalies 131 that are not in set of instrumented anomalies 132.

An instrumented anomaly in set of instrumented anomalies 132 can be determined to exist in set of detected anomalies if there exists a detected anomaly in set of detected anomalies 131 with the same timestamp as the instrumented anomaly. Here, same timestamp can be exactly the same timestamp or where the two timestamps are within a margin of error of each other. The margin of error can be selected based on the interval between data points of instrumented time series 141 with a smaller interval corresponding to a smaller margin of error and a larger interval corresponding to a larger margin of error. A detected anomaly in set of detected anomalies 131 can be determined not to exist in set of instrumented anomalies 132 if there does not exist an instrumented anomaly in the set of instrumented anomalies 132 with the same timestamp as the detected anomaly. Here, same timestamp can be exactly the same timestamp or where the two timestamps are not within the margin of error.

Figure 6:
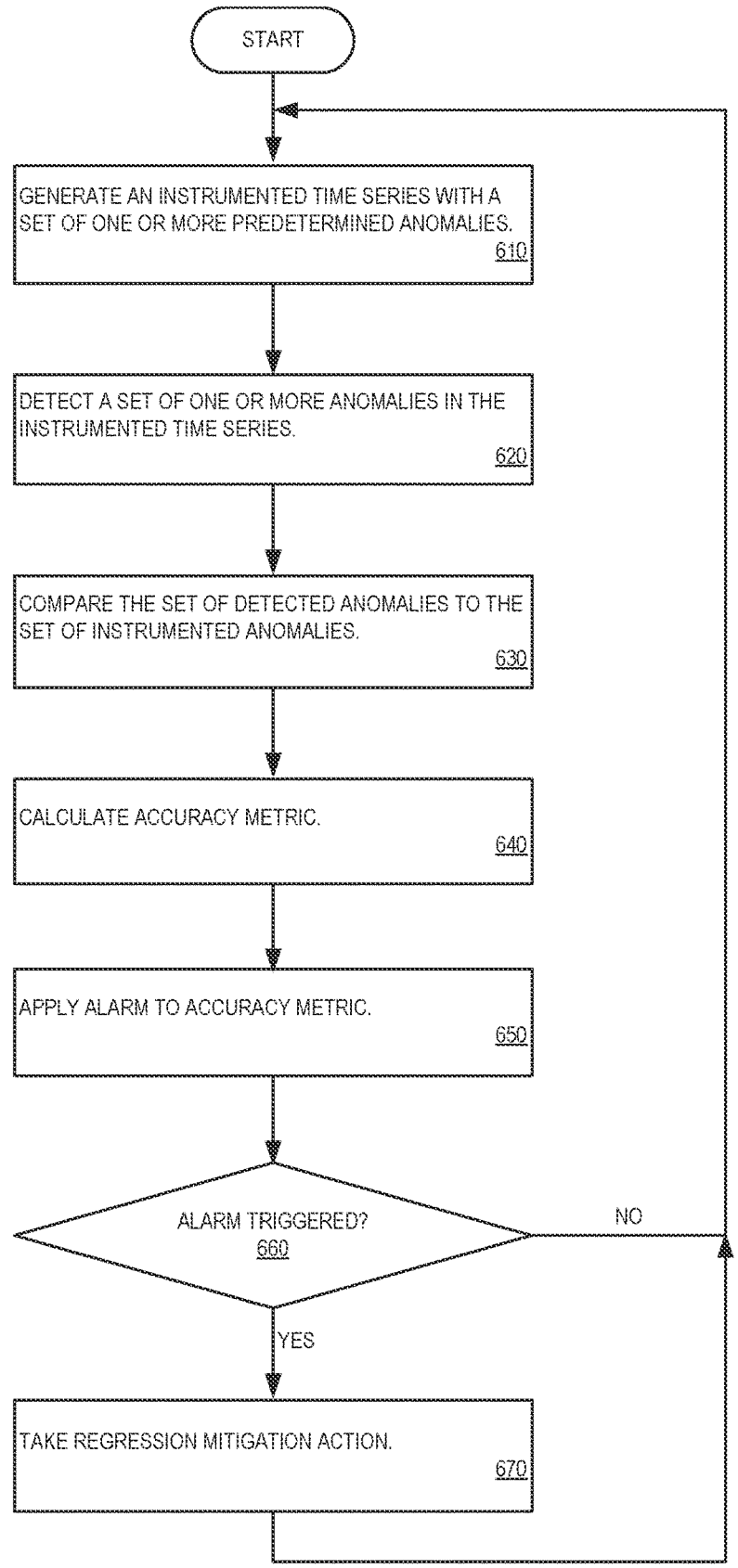
FIG. 6 is a flowchart of a method for accuracy regression detection for time series anomaly detection compute services, according to some examples.

FIG. 6 is a flowchart of a method for accuracy regression detection for time series anomaly detection compute services, according to some examples.

At operation 610, an instrumented time series is generated with a set of one or more predetermined anomalies. The instrumented time series can be generated to have a set of historical data points that do not encompass any of the set of predetermined anomalies and a set of continuous data points that encompass the set of predetermined anomalies. An anomaly detection service can learn the baseline pattern(s) of the instrumented time series from the historical data point portion. Once the baseline pattern(s) of the instrumented time series have been learned by anomaly detection service from the historical data point portion of the instrumented time series, then anomaly detection service can continually attempt to detect anomalies in the continuous data point portion on a regular interval (e.g., once every 5 minutes, once every hour, once every day). At the same time, new continuous data points with instrumented anomalies can be generated on the regular interval (e.g., one every five minutes, one every hour, once every day).

An anomaly instrumented into the instrumented time series can be a point anomaly or a subset anomaly. The magnitude of the anomaly at a given point in the time series to be instrumented can be relative to a baseline (non-anomalous) value of the point in the time series or other baseline value associated with the time series to be instrumented. The magnitude can be randomly selected within a range either as a percentage increase or a percentage decrease or as an absolute increase or an absolute decrease. For example, for a given baseline value BV for a point in the times series to be instrumented with an anomaly at the data point, the anomalous value AV of the point in the instrumented time series can be calculated as AV=BV+ (BV*X) where X is a percentage decrease or a percentage increase that is predetermined or randomly selected within a range (e.g., between thirty to sixty percent). As another example, for a given baseline value BV for a point in the time series to be instrumented with an anomaly at the data point, the anomalous value AV of the point in the instrumented time series can be calculated as AV=BV+X where X is an absolute decrease or increase that is predetermined or randomly selected within a range. As yet another example, for a point in the time series to be instrumented with an anomaly at the data point, the anomalous value AV of the point in the instrumented time series can be predetermined or randomly selected within a range and not calculated relative to a baseline value BV.

In some examples, a set of multiple times series are instrumented with the set of predetermined anomalies at operation 610. In this case, the set of time series can be analyzed together for anomalies by the anomaly detection service. The predetermined anomalies can be instrumented across two or more of the multiple time series. Alternatively, the predetermined anomalies can be instrumented in just one of the multiple time series.

At operation 620, a set of one or more anomalies is detected in instrumented time series by the anomaly detection service. The anomaly detection service can detect the set of anomalies over one or more detector intervals. For example, if the detector interval is ten minutes and the set of anomalies is detected over 18 detector intervals, then the set of anomalies is detected within a three-hour window of the instrumented time series. A detected anomaly can be associated with a timestamp of the detected anomalous data point. The detected anomaly can also be associated with the value of the anomalous data point. The detected anomaly can also be associated the severity score assigned to the anomalous data point by the anomaly detection service. The detected anomaly can also be associated with an identifier of the time series in which the anomaly was detected which is useful if there are multiple time series.

At operation 630, the set of anomalies detected in operation 620 is compared to the set of predetermined anomalies instrumented in operation 630. The comparison is performed to determine the number of false positives, the number of false negatives, and the number of true positives. A true positive is an anomaly in the set of instrumented anomalies that also exists in the set of detected anomalies. A false positive is an anomaly that exists in the set of detected anomalies that does not also exist in the set of instrumented anomalies. A false negative is an anomaly that exists in the set of instrumented anomalies that does not also exist in the set of detected anomalies.

Comparing the set of instrumented anomalies in the instrumented time series to the set of detected anomalies can encompass approximate or threshold comparisons. In particular, two timestamps can be considered to correspond if the timestamps are exactly equal, equal to a predetermined time resolution, or within a predetermined threshold amount of time of each other. For example, if the time resolution of the timestamps is to the millisecond, then the timestamps can be considered to correspond if they are for the same second in time or the same minute in time or within a predetermine threshold number of milliseconds, seconds, or minutes of each other.

In some examples, an anomaly with timestamp TS-1 in the set of instrumented anomalies is considered to exist in the set of detected anomalies (true positive) if there is a data point in the set of detected anomalies with timestamp TS-2 that corresponds to timestamp TS-1. If there is no such data point in the set of detected anomalies, then the anomaly is considered not to exist in the set of detected anomalies (false negative). Likewise, an anomaly in the set of detected anomalies is considered not exist in the set of instrumented anomalies (false positive) if there is no anomaly in the set of instrumented anomalies with a timestamp that corresponds to the timestamp of the detected anomaly.

In some examples, an anomaly in the set of instrumented anomalies is not considered to exist in the set of detected anomalies even if the respective timestamps correspond unless the magnitude of the instrumented anomaly corresponds to the severity score of the detected anomaly. For example, an anomaly in the set of instrumented anomalies can have a timestamp that corresponds to a timestamp of a detected anomaly. However, the instrumented anomaly might not be considered to correspond to the detected anomaly if the magnitude of the instrumented anomaly is great yet the severity score of the detected anomaly indicates that the magnitude of the detected anomaly is mild or low.

At operation 640, an accuracy metric is calculated based on the number of true positives, the number of false positives, and the number of false negatives determined in operation 630. In particular, from these numbers a precision metric and a recall metric can be calculated. And from the precision metric and the recall metric and accuracy metric can be calculated in the form of a F-score of F-measure such as an $F_1$ score or an $F_\beta$ score.

At operation 650, a regression detection alarm is applied to the calculated accuracy metric. At operation 660, it is determined if the alarm is triggered by the accuracy metric. The alarm may be triggered if the accuracy metric, possibly in conjunction with one or more previously calculated accuracy metrics depending on the alarm configuration, is below an accuracy metric threshold such as below an $F_1$ score threshold or an $F_\beta$ score threshold. If the alarm is not triggered at operation 660, then the method repeats starting again with operation 610 where a new set of continuous data points of the instrumented time series is generated on the next instrumented time series generation interval for analysis by anomaly detection service. On the other hand, if the alarm is triggered at operation 660, then a regression mitigation action is taken 670 before repeating the method. The regression migration action can be, for example, sending an alert to a user informing of the alarm being triggered or automatically rolling back a current version of an anomaly detection algorithm or model used by the anomaly detection service to detect anomalies on the instrumented time series to a previous version.

In some examples, an additional regression detection alarm is applied to the calculated precision or recall metric. In this case, an alarm can be triggered at operation 660 by the precision or recall metric. For example, the additional alarm can be triggered if the precision or recall metric, possibly in conjunction with one or more previously calculated precision or recall metrics depending on the alarm configuration, is below a precision or recall metric threshold.

Figure 7:
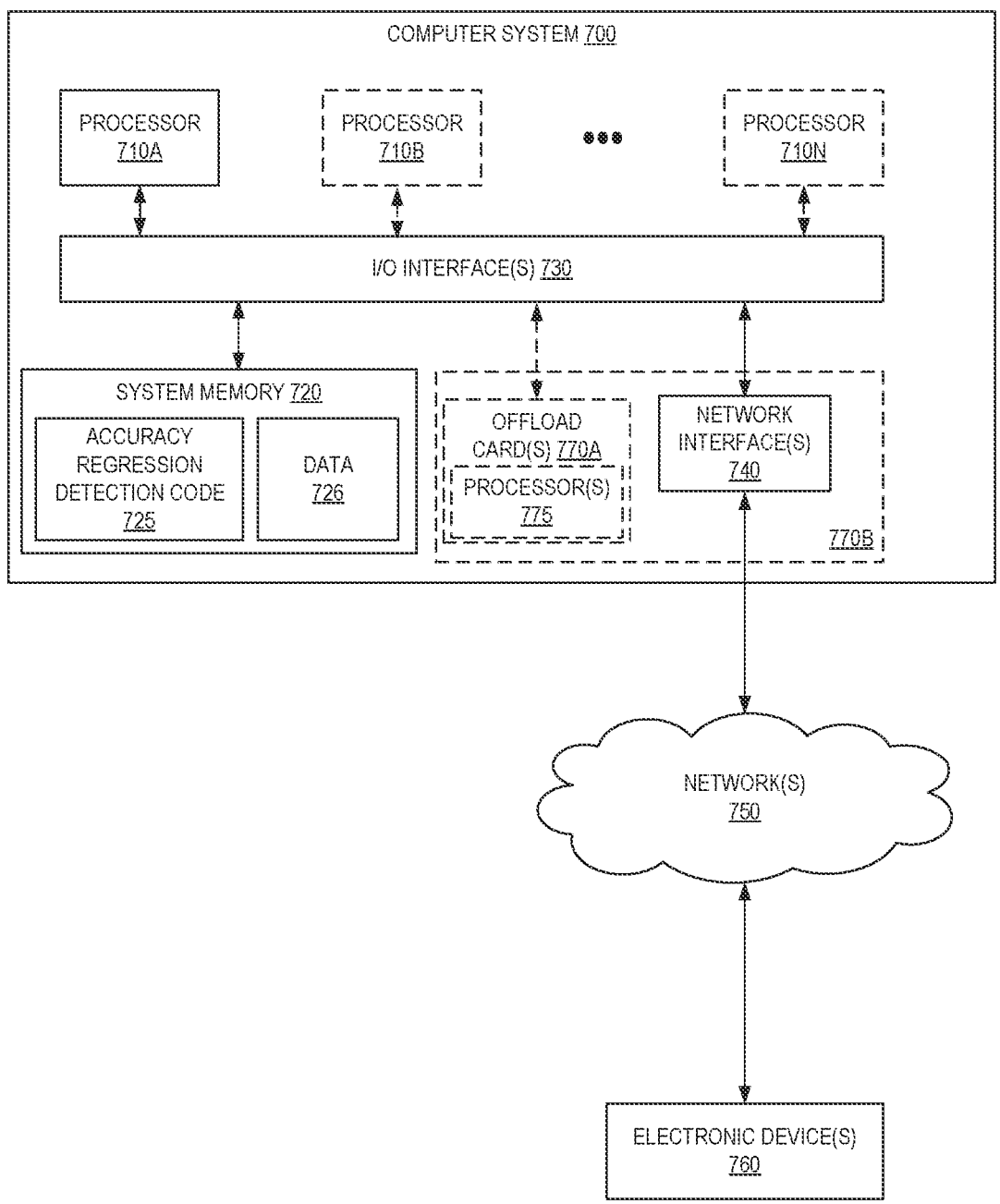
FIG. 7 is a block diagram illustrating an example computer system that can be used in some examples.

FIG. 7 illustrates computer system 700 that can be used in an implementation of accuracy regression detection for time series anomaly detection compute services, according to some examples. Computer system 700 can include one or more processors 710 coupled to system memory 720 via input/output (I/O) interface 730. System 700 can further include network interface 740 coupled to I/O interface 730.

While FIG. 7 shows computer system 700 as a single computing device, in some examples computer system 700 can include one computing device or any number of computing devices configured to work together as an overall computer system 700 as in a distributed, parallel, clustered, or other coupled computing system arrangement.

Computer system 700 can be a uniprocessor system including one processor 710, or can be a multiprocessor system including several processors 710 (e.g., two, four, eight, or another suitable number). Processor(s) 710 can be any suitable processor(s) capable of executing instructions. For example, in various embodiments, processor(s) 710 can be general-purpose or embedded processors implementing any of a variety of instruction set architectures (ISAs), such as the X86, ARM, POWERPC, SPARC, or MIPS ISAs, or any other suitable ISA. In multiprocessor systems, each of processors 710 can commonly, but not necessarily, implement the same ISA.

System memory 720 can store instructions and data accessible by the processor(s) 710. In various embodiments, system memory 720 can be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 720 as accuracy regression detection code 725 (e.g., executable to implement, in whole or in part, techniques disclosed herein for accuracy regression detection for time series anomaly detection compute services) and data 726.

I/O interface 730 can be configured to coordinate I/O traffic between processor(s) 710, system memory 720, and any peripheral devices in the device, including network interface 740 or other peripheral interfaces (not shown). I/O interface 730 can perform any necessary protocol, timing, or other data transformations to convert data signals from one component (e.g., system memory 720) into a format suitable for use by another component (e.g., processor(s) 710). I/O interface 730 can include support for devices attached through various types of peripheral buses, such as a variant of the PERIPHERAL COMPONENT INTERCONNECT (PCI) bus standard or the UNIVERSAL SERIAL BUS (USB) standard, for example. The function of I/O interface 730 can be split into two or more separate components, such as a north bridge and a south bridge, for example. Also, some or all of the functionality of I/O interface 730, such as an interface to system memory 720, can be incorporated directly into processor 710.

Network interface 740 can be configured to allow data to be exchanged between computer system 700 and other devices 760 attached to network(s) 750, such as other computer systems or devices as illustrated in FIG. 1, for example. Network interface 740 can support communication via any suitable wired or wireless general data networks, such as types of Ethernet network, for example. Additionally, network interface 740 can support communication via telecommunications/telephony networks, such as analog voice networks or digital fiber communications networks, via storage area networks (SANs), such as Fibre Channel SANs, and/or via any other suitable type of network and/or protocol.

Computer system 700 can include one or more offload cards 770A or 770B (including one or more processors 775, and possibly including one or more network interfaces 740) that are connected using I/O interface 730 (e.g., a bus implementing a version of the PERIPHERAL COMPONENT INTERCONNECT-EXPRESS (PCI-E) standard, or another interconnect such as a QUICKPATH INTERCONNECT (QPI) or ULTRAPATH INTERCONNECT (UPI)). For example, computer system 700 can act as a host electronic device (e.g., operating as part of a hardware virtualization service) that hosts compute resources such as compute instances, and one or more offload cards 770A or 770B can execute a virtualization manager that can manage compute instances that execute on the host electronic device. As an example, offload card(s) 770A or 770B can perform compute instance management operations, such as pausing or un-pausing compute instances, launching or terminating compute instances, performing memory transfer/copying operations, etc. These management operations can be performed by offload card(s) 770A or 770B in coordination with a hypervisor (e.g., upon a request from a hypervisor) that is executed by other processors 710A-710N of computer system 700. However, the virtualization manager implemented by offload card(s) 770A or 770B can accommodate requests from other entities (e.g., from compute instances themselves).

System memory 720 can be a computer-accessible medium configured to store program instructions and data. However, program instructions or data can be received, sent, or stored upon different types of computer-accessible media. Computer-accessible media includes non-transitory computer-accessible media and computer-accessible transmission media. Examples of non-transitory computer-accessible media includes volatile or non-volatile computer-accessible media. Volatile computer-accessible media includes, for example, most general-purpose random-access memory (RAM) including dynamic RAM (DRAM) and static RAM (SRAM). Non-volatile computer-accessible media includes, for example, semiconductor memory chips capable of storing instructions or data in floating-gate memory cells composed of floating-gate metal-oxide-semiconductor field effect transistors (MOSFETs), including FLASH memory such as NAND flash and solid-state drives (SSD). Other examples of non-volatile computer-accessible media include read-only memory (ROM), erasable programmable ROM (EPROM), electrically erasable programmable ROM (EEPROM), ferroelectric RAM, and other computer data storage devices (e.g., disk storage, hard disks drives, optical discs, floppy disks, and magnetic tape).

In the foregoing detailed description, reference is made to examples, examples of which are illustrated in the accompanying drawings. Numerous specific details are set forth to provide a thorough understanding of the examples. However, it will be apparent to those skilled in the art that some examples can be practiced without these specific details. In other instances, well-known elements, features, acts, or operations have not been described in detail so as not to unnecessarily obscure the examples.

Unless the context clearly indicates otherwise, the term "or" is used in the foregoing description and in the appended claims in its inclusive sense (and not in its exclusive sense) so that when used, for example, to connect a list of elements, features, acts, or operations, the term "or" means one, some, or all the elements, features, acts, or operations in the list.

Unless the context clearly indicates otherwise, the terms "comprising," "including," "having," "based on," "encompassing," and other like terms, are used in the foregoing description and in the appended claims in an open-ended fashion, and do not exclude additional elements, features, acts, or operations.

Unless the context clearly indicates otherwise, conjunctive language in the foregoing description and in the appending claims such as the phrase "at least one of X, Y, and Z," is to be understood to convey that an item, term, etc. can be either X, Y, or Z, or a combination thereof. Thus, such conjunctive language is not intended to require by default implication that at least one of X, at least one of Y, and at least one of Z to each be present.

Unless the context clearly indicates otherwise, as used in the foregoing description and in the appended claims, the singular forms "a," "an," and "the" are intended to include the plural forms as well.

Unless the context clearly indicates otherwise, in the foregoing detailed description and in the appended claims, although the terms first, second, etc. are, in some instances, used herein to describe various elements, features, acts, or operations, these features, acts, or operations should not be limited by these terms. These terms are only used to distinguish one element, feature, act, or operation from another. For example, a first computing device could be termed a second computing device, and, similarly, a second computing device could be termed a first computing device. The first computing device and the second computing device are both computing devices, but they are not the same computing device.

What is claimed is:

1. A method comprising:
   determining a first set of one or more anomalies to instrument a time series with;
   instrumenting the time series with the first set of one or more anomalies;
   providing the instrumented time series to an anomaly detection service in a provider network;
   receiving a second set of one or more anomalies detected by the anomaly detection service in the instrumented time series;
   determining an anomaly detection accuracy metric based on the first set of one or more instrumented anomalies and the second set of one or more detected anomalies;

determining that an anomaly detection accuracy regression occurred with the anomaly detection service based on the determined anomaly detection accuracy metric; and based on determining that the anomaly detection accuracy regression occurred with the anomaly detection service, performing a regression mitigating action.

2. The method of claim 1, further comprising:
based on determining that the anomaly detection accuracy regression occurred, sending an alert about the anomaly detection accuracy regression, wherein the alert is received at a personal computing device of a user.

3. The method of claim 1, further comprising:
based on determining that the anomaly detection accuracy regression occurred, rolling back a version of an algorithm or a model, used by the anomaly detection service to detect the set of one or more detected anomalies in the instrumented time series, to a prior version of the algorithm or the model.

4. A method comprising:
providing an instrumented time series to an anomaly detection service, the instrumented time series instrumented with a set one or more anomalies;
receiving a set of one or more anomalies detected in the instrumented time series by the anomaly detection service;
determining an anomaly detection accuracy metric based on the set of one or more instrumented anomalies and the set of one or more detected anomalies;
determining that an anomaly detection accuracy regression occurred based on the determined anomaly detection accuracy metric; and
based on determining that the anomaly detection accuracy regression occurred, performing a regression mitigating action.

5. The method of claim 4, further comprising:
generating the instrumented time series with the set of one or more instrumented anomalies and with a set of one or more baseline values.

6. The method of claim 4, further comprising:
determining a precision metric based on the set of one or more instrumented anomalies and the set of one or more detected anomalies;
determining a recall metric based on the set of one or more instrumented anomalies and the set of one or more detected anomalies; and
determining the anomaly detection accuracy metric based on the precision metric and the recall metric.

7. The method of claim 4, further comprising:
based on determining that the anomaly detection accuracy regression occurred, sending an alert about the anomaly detection accuracy regression, wherein the alert is received at a personal computing device of a user.

8. The method of claim 4, further comprising:
based on determining that the anomaly detection accuracy regression occurred, rolling back a version of an algorithm or a model, used by the anomaly detection service to detect the set of one or more detected anomalies in the instrumented time series, to a prior version of the algorithm or the model.

9. The method of claim 4, further comprising:
determining that the anomaly detection accuracy regression occurred based on comparing the determined anomaly detection accuracy metric to an accuracy metric threshold.

10. The method of claim 4, wherein the determined anomaly detection accuracy metric comprises an $F_1$ score.

11. The method of claim 4, further comprising:
determining a set of anomaly detection accuracy metrics based on sets of one or more instrumented anomalies and sets of one or more detected anomalies; and
determining that the anomaly detection accuracy regression occurred based on consecutive anomaly detection accuracy metrics of the set of anomaly detection accuracy metric being below a threshold accuracy metric value.

12. The method of claim 4, further comprising:
determining a number of instrumented anomalies of the set of one or more instrumented anomalies that are also detected anomalies in the set of one or more detected anomalies; and
determining the anomaly detection accuracy metric based on the number.

13. The method of claim 4, further comprising:
determining a number of instrumented anomalies of the set of one or more instrumented anomalies that are not also detected anomalies in the set of one or more detected anomalies; and
determining the anomaly detection accuracy metric based on the number.

14. The method of claim 4, further comprising:
determining a number of detected anomalies of the set of one or more detected anomalies that are not also instrumented anomalies in the set of one or more instrumented anomalies; and
determining the anomaly detection accuracy metric based on the number.

15. A system comprising:
a set of one or more electronic devices, comprising one or more hardware processors and memory, to implement a provider network, the provider network comprising instructions which when executed cause the provider network to:
determine a first set of one or more anomalies to instrument a time series with;
instrument the time series with the first set of one or more anomalies;
provide the instrumented time series to an anomaly detection service in the provider network;
receive a second set of one or more anomalies detected by the anomaly detection service in the instrumented time series;
determine an anomaly detection accuracy metric based on the first set of one or more instrumented anomalies and the second set of one or more detected anomalies;
determine that an anomaly detection accuracy regression occurred with the anomaly detection service based on the determined anomaly detection accuracy metric; and
based on determining that the anomaly detection accuracy regression occurred with the anomaly detection service, performing a regression mitigating action.

16. The system of claim 15, the provider network further comprising instructions which when executed cause the provider network to:
generate the instrumented time series with the set of one or more instrumented anomalies and with a set of one or more baseline values.

17. The system of claim 15, the provider network further comprising instructions which when executed cause the provider network to:

determine a precision metric based on the set of one or more instrumented anomalies and the set of one or more detected anomalies;

determine a recall metric the based on the set of one or more instrumented anomalies and the set of one or more detected anomalies; and determine the anomaly detection accuracy metric based on the precision metric and the recall metric.

18. The system of claim 15, the provider network further comprising instructions which when executed cause the provider network to:

send, based on determining that the anomaly detection accuracy regression occurred, an alert about the anomaly detection accuracy regression, wherein the alert is received at a personal computing device of a user.

19. The system of claim 15, the provider network further comprising instructions which when executed cause the provider network to:

roll back, based on determining that the anomaly detection accuracy regression occurred, a version of an algorithm or a model, used by the anomaly detection service to detect the set of one or more detected anomalies in the instrumented time series, to a prior version of the algorithm or the model.

20. The system of claim 15, the provider network further comprising instructions which when executed cause the provider network to:

determine that the anomaly detection accuracy regression occurred based on comparing the determined anomaly detection accuracy metric to an accuracy metric threshold.

* * * * *